(12) United States Patent
Wells et al.

(10) Patent No.: US 10,467,153 B2
(45) Date of Patent: Nov. 5, 2019

(54) METHODS FOR CONTROLLING A COMPUTING DEVICE, COMPUTER-READABLE MEDIA, AND COMPUTING DEVICES

(71) Applicant: RAZER (ASIA-PACIFIC) PTE. LTD., Singapore (SG)

(72) Inventors: Stuart Wells, San Francisco, CA (US); Sandip Pal, Union City, CA (US)

(73) Assignee: Razer (Asia-Pacific) Pte. Ltd., Singapore (SG)

( * ) Notice: Subject to any disclaimer, the term of this patent is extended or adjusted under 35 U.S.C. 154(b) by 0 days.

(21) Appl. No.: 16/067,230

(22) PCT Filed: Dec. 31, 2015

(86) PCT No.: PCT/SG2015/050518
§ 371 (c)(1),
(2) Date: Jun. 29, 2018

(87) PCT Pub. No.: WO2017/116304
PCT Pub. Date: Jul. 6, 2017

(65) Prior Publication Data
US 2019/0012276 A1 Jan. 10, 2019

(51) Int. Cl.
*G06F 9/54* (2006.01)
*G06F 13/10* (2006.01)
*G06F 13/14* (2006.01)
*G06F 8/36* (2018.01)
*G06F 9/4401* (2018.01)
*G06F 9/445* (2018.01)
(Continued)

(52) U.S. Cl.
CPC .............. *G06F 13/102* (2013.01); *G06F 8/36* (2013.01); *G06F 9/4411* (2013.01); *G06F 9/44526* (2013.01); *G06F 9/544* (2013.01); *G06F 9/545* (2013.01); *G06F 13/10* (2013.01); *G06F 13/14* (2013.01); *G06F 16/00* (2019.01); *G06F 16/188* (2019.01)

(58) Field of Classification Search
CPC .................................................... G06F 9/4411
USPC ....................................................... 719/321
See application file for complete search history.

(56) References Cited

U.S. PATENT DOCUMENTS 7,161,926 B2 * 1/2007 Elson ..................... G01D 9/005 370/338
7,480,789 B1 1/2009 Donlin et al.
(Continued)

OTHER PUBLICATIONS

Extended European Search Report dated Dec. 10, 2018, 9 pages, for the corresponding European Patent Application No. 15912153.2.
(Continued)

*Primary Examiner* — Andy Ho
(74) *Attorney, Agent, or Firm* — Polsinelli PC

(57) ABSTRACT

According to various embodiments, a method for controlling a computing device may be provided. The method may include: controlling a central processing unit; providing using a kernel an interface between the central processing unit and an application to be executed by the central processing unit; providing a software in a user space; providing a virtual file system in the kernel; and communicating using a communication interface between the software and the virtual file system.

20 Claims, 7 Drawing Sheets

(51) Int. Cl.
*G06F 16/00* (2019.01)
*G06F 16/188* (2019.01)

(56) References Cited

U.S. PATENT DOCUMENTS

| | | | |
|---|---|---|---|
| 8,195,929 | B2 | 6/2012 | Banga et al. |
| 8,261,257 | B1 | 9/2012 | Huang et al. |
| 8,745,442 | B1 | 6/2014 | Havemose |
| 8,806,511 | B2 | 8/2014 | Adda et al. |
| 8,832,688 | B2 | 9/2014 | Tang et al. |
| 8,997,122 | B2 | 3/2015 | Morreale |
| 9,455,914 | B2 * | 9/2016 | Singh ............... H04L 47/11 |
| 2003/0014521 | A1 | 1/2003 | Elson et al. |
| 2006/0242270 | A1 | 10/2006 | Sankaranarayan et al. |
| 2012/0221890 | A1 | 8/2012 | Das |
| 2013/0304778 | A1 | 11/2013 | Vanderhallen |
| 2014/0173600 | A1 | 6/2014 | Ramakrishnan Nair |
| 2014/0188811 | A1 | 7/2014 | Yang |
| 2014/0201156 | A1 | 7/2014 | Rosikiewicz |
| 2015/0040143 | A1 | 2/2015 | Glover |
| 2015/0088943 | A1 | 3/2015 | Song |
| 2015/0127763 | A1 | 5/2015 | Pope |
| 2015/0201059 | A1 | 7/2015 | Huang |
| 2015/0207678 | A1 | 7/2015 | Li et al. |

OTHER PUBLICATIONS

Greg Kroah-Hartman: "Udev—A Userspace Implentation of devfs", Internet Citation, Jul. 2003 (Jul. 2003), XP002463721, Retrieved from the Internet: URL: http://duke.pbl.hr/linux/symposium/ols2003/LinuxSymposium2003-2side.pdf, 17 pages.

Alan Ott: "Tutorial: How to use libudev and Sysfs in Linux", May 23, 2010 (May 23, 2010), XP055526938, Retrieved from the Internet: URL: http://www.signal11.us/oss/udev/ in 3 pages.

International Search Report and Written Opinion, dated Sep. 19, 2016, for the corresponding International Application No. PCT/SG2015/050518 in 11 pages.

"Proofs", last updated Jun. 16, 2018, published on Wikipedia (https://en.wikipedia.org/wiki/Proofs).

"Sysfs", last updated Jul. 24, 2018, published on Wikipedia (https://en.wikipedia.org/wiki/Sysfs).

"Libfuse", published 2018 GitHub, Inc. (https://github.com/libfuse/libfuse).

"Linux Kernal Infrastructure for User-Level Device Drivers", published article May 2004, ResearchGate, Source: CiteSeer by author Peter Chubb Jan. 2004, National ICT Australia Ltd in 9 pages.

* cited by examiner

METHODS FOR CONTROLLING A COMPUTING DEVICE, COMPUTER-READABLE MEDIA, AND COMPUTING DEVICES

TECHNICAL FIELD

Various embodiments generally relate to methods for controlling a computing device, computer-readable media, and computing devices.

BACKGROUND

In commonly used operating systems (or kernels), if a hardware device is connected, a device driver must be present to control it. The device drivers may be provided in the operating system/kernel and may create a standard interface for programs to use that resource. On the Linux/Unix kernel, a virtual file system may be used to setup and provide information about the device for applications to query. However, problems may arise if the device driver is moved to user space. Thus, there may be a need for enhanced methods.

SUMMARY OF THE INVENTION

According to various embodiments, a method for controlling a computing device may be provided. The method may include: controlling a central processing unit; providing using a kernel an interface between the central processing unit and an application to be executed by the central processing unit; providing a software in a user space; providing a virtual file system in the kernel; and communicating using a communication interface between the software and the virtual file system.

According to various embodiments, a computer-readable medium may be provided. The computer-readable medium may include instructions which, when executed by a computer, make the computer perform a method for controlling a computing device. The method may include: controlling a central processing unit; providing using a kernel an interface between the central processing unit and an application to be executed by the central processing unit; providing a software in a user space; providing a virtual file system in the kernel; and communicating using a communication interface between the software and the virtual file system.

According to various embodiments, a computing device may be provided. The computing device may include: a central processing unit; a kernel configured to provide an interface between the central processing unit and an application to be executed by the central processing unit; a software provided in a user space; a virtual file system provided in the kernel; and a communication interface between the software and the virtual file system.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

Figure 1:
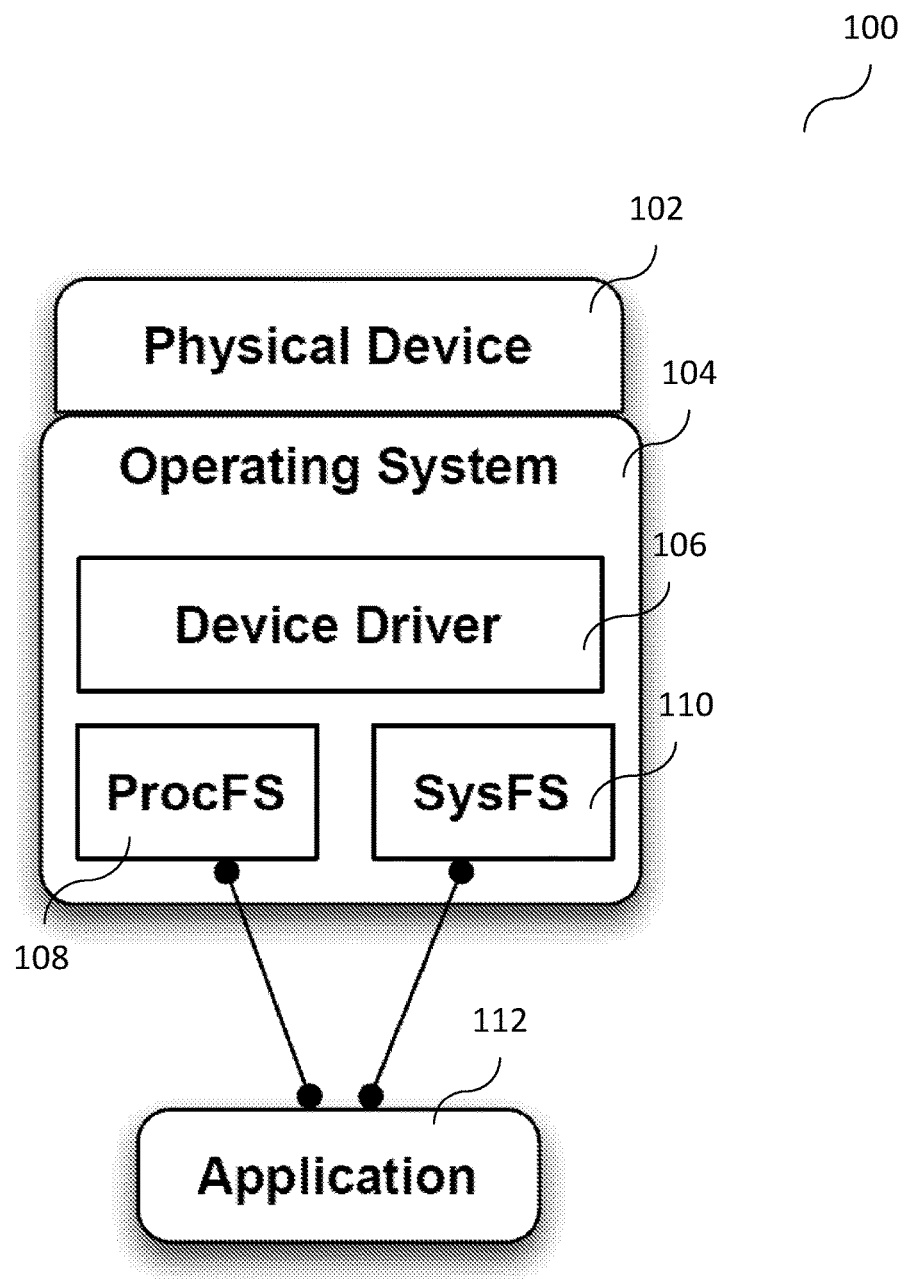
FIG. 1 shows an illustration of a commonly used driver structure.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the computing device as described in this description may include a memory which is for example used in the processing carried out in the computing device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

In commonly used operating systems (or kernels), if a hardware device is connected, a device driver must be present to control it. The device drivers may be provided in the operating system/kernel and may create a standard interface for programs to use that resource. On the Linux/Unix kernel, a virtual file system may be used to setup and provide information about the device for applications to query.

FIG. 1 shows an illustration 100 of a commonly used driver structure. A physical device 102 may include an operating system 104. A device driver 106 (or device drivers; in other words: drivers) may be present (for example in Linux/Unix kernels) to control hardware (of the physical device). These drivers may provide information about the state of the driver and hardware by using a virtual file system known as proc file system (ProcFS) 108 or sys file system (SysFS) 110. An application 112 (or applications) may use these virtual files to setup the hardware and determine its current working state. In other words, the application 112 may use Proc (in other words: ProcFS 108) or Sys (in other words: SysFS 110) to setup or gather information about the device driver 106.

It will be understood that the proc filesystem (procfs) is a special filesystem in Unix-like operating systems that presents information about processes and other system information in a hierarchical file-like structure, providing a more convenient and standardized method for dynamically accessing process data held in the kernel than traditional tracing methods or direct access to kernel memory. Typically, it is mapped to a mount point named/proc at boot time. The proc file system acts as an interface to internal data structures in the kernel. It can be used to obtain information about the system and to change certain kernel parameters at runtime (sysctl).

It will be understood that sysfs is a virtual file system provided by the Linux kernel that exports information about various kernel subsystems, hardware devices, and associated device drivers from the kernel's device model to user space through virtual files. In addition to providing information about various devices and kernel subsystems, exported virtual files are also used for their configuring.

A change may be underway in operating systems/kernels to move these drivers into user space and create a thin hardware API (application programming interface) to control that device. This may allow the device driver to be independent of specific versions of the operating system/kernel, while still offering full control of the hardware. Since the device driver is no longer in the kernel, the existing virtual file systems are no longer available to provide information about the state of the driver or hardware. An example of this may be used in Android devices, where the Bluetooth driver may be a user space device driver called bluedroid. Since the actual device driver is in user space, an application can no longer use the Prof or Sys Virtual File System to gather information or setup the device driver.

Another user space device driver being used in Linux/Android/Unix kernels may be the File System in user space (which may be referred to as FUSE or Fuse) interface. This is an interface that allows propriety file systems to be used by a Linux/Android/Unix kernel, while not actually in the GPL (GNU General Public License) kernel. This was originally done to help Open Source Code have access to propriety file systems.

Figure 2:
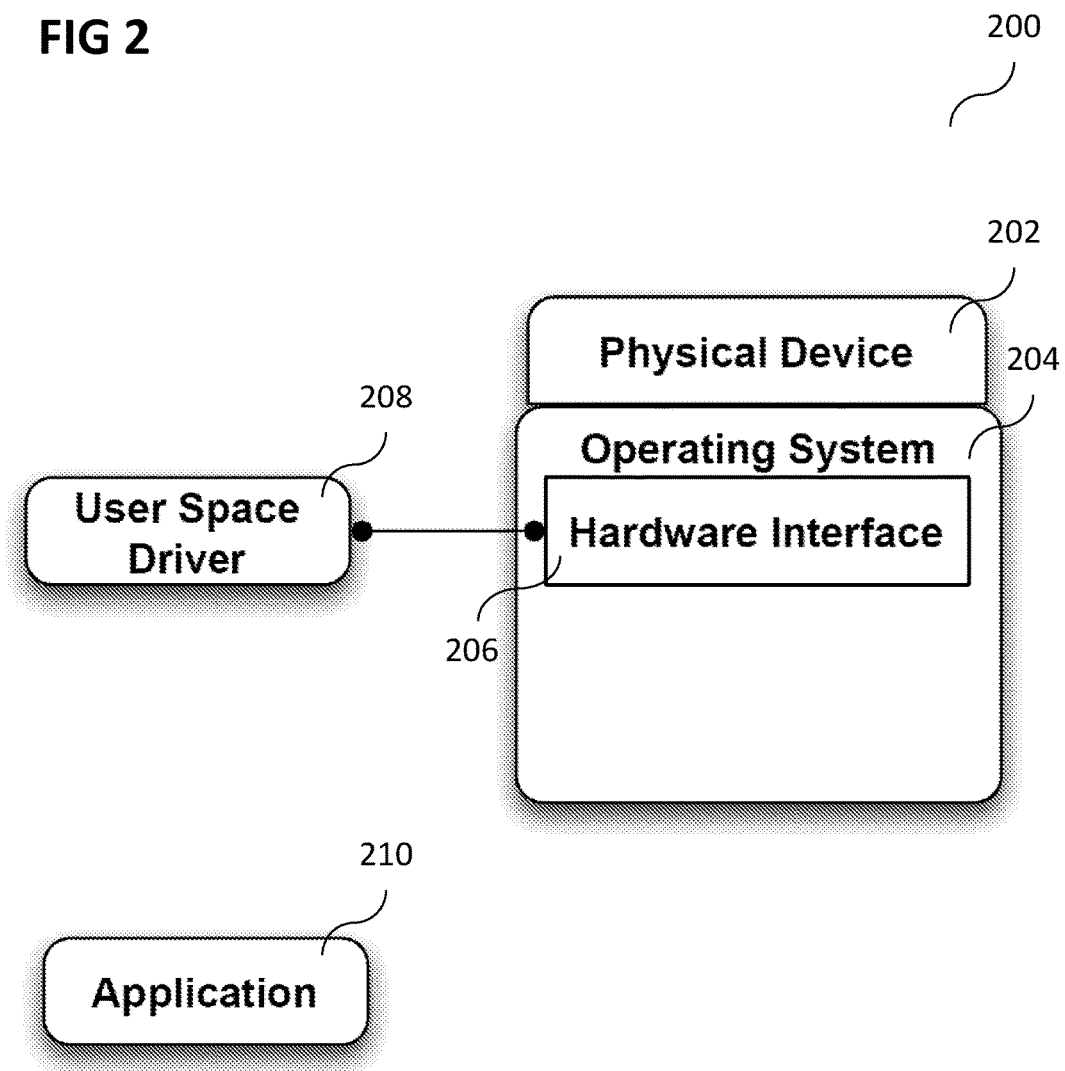
FIG. 2 shows an illustration of a commonly used state of device driver in user space.

FIG. 2 shows an illustration 200 of a commonly used state of device driver in user space. A physical device 202 may include an operation system with a hardware interface 206. A user space driver 208 (in other words: a hardware driver in user space) may be provided. An application 210 may not have access to information about the hardware as it may not communicate with the hardware driver in user space.

According to various embodiments, devices and methods may be provided for creating a standard interface or library to recreate the virtual file systems so that applications can access the driver and hardware state using files.

According to various embodiments, a user space virtual driver interface may be provided.

According to various embodiments, devices and methods may be provided to create virtual file systems (for example similar to proc or sys) that a user space device driver can use, so that an application can control or gather its state.

Various devices and methods according to various embodiments may provide fast access, since device drivers may operate in almost real time. According to various embodiments, a virtual interface may be provided.

Figure 3A:
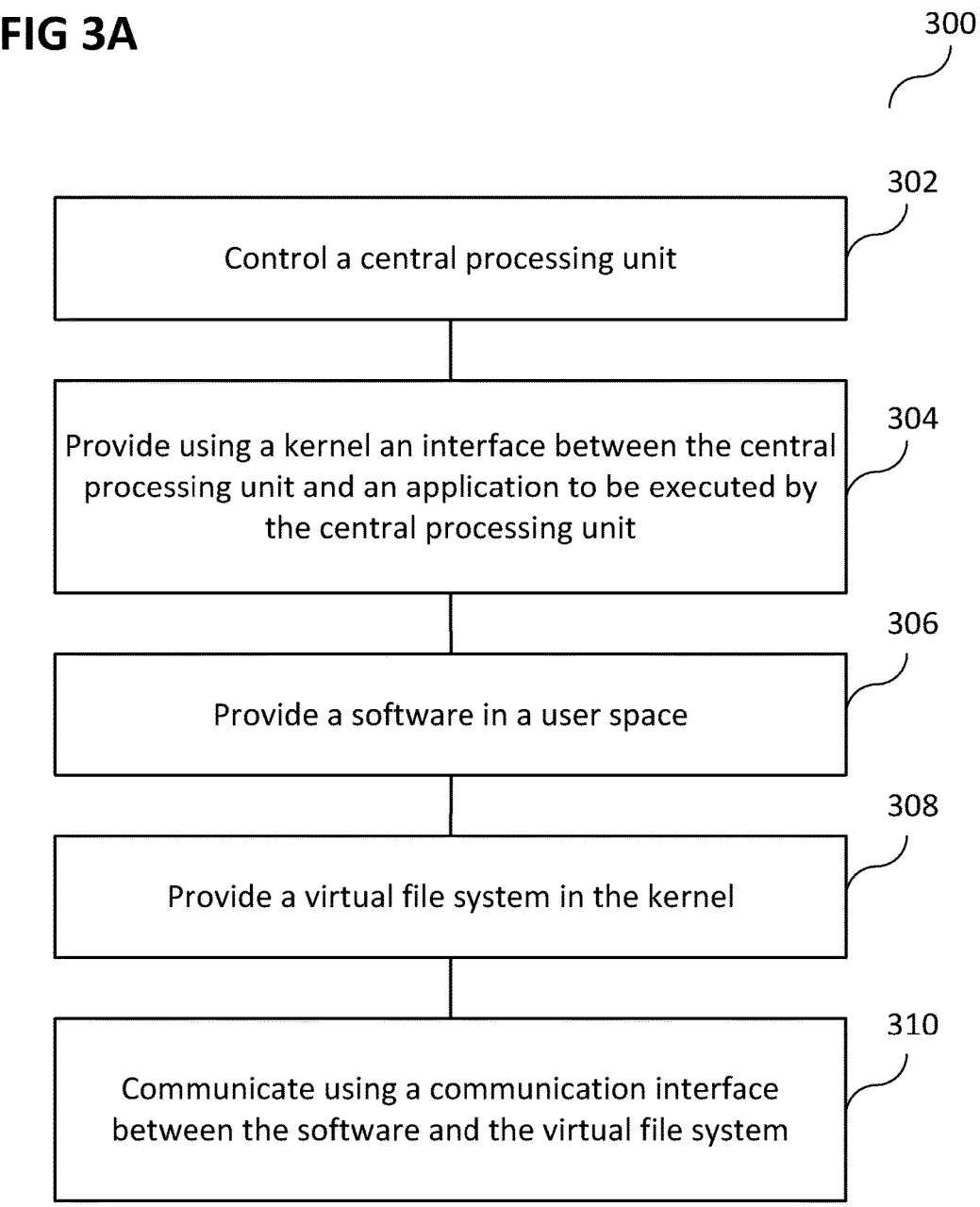
FIG. 3A shows a flow diagram illustrating a method for controlling a computing device according to various embodiments.

FIG. 3A shows a flow diagram 300 illustrating a method for controlling a computing device according to various embodiments. In 302, a central processing unit may be controlled. In 304, an interface between the central processing unit and an application to be executed by the central processing unit may be provided using a kernel. In 306, a software may be provided in a user space. In 308, a virtual file system may be provided in the kernel. In 310, using a communication interface, it may be communicated between the software and the virtual file system. According to various embodiments, communication between a software and a virtual file system may be understood as to include the interchange of information (unidirectional, for example from the software to the virtual file system, or vice versa, or bidirectional) between the software and the virtual file system; for example, data available at either the software or the virtual file system may be made available at the respective other side.

In other words, an application may communicate with a driver in user space via the kernel.

According to various embodiments, the virtual file system may include or may be or may be included in ProcFS and/or a SysFS.

According to various embodiments, the communication interface may include or may be or may be included in a fuse interface.

According to various embodiments, the fuse interface may be provided in the kernel.

According to various embodiments, the communication interface may include or may be or may be included in a virtual interface.

According to various embodiments, the virtual interface may be provided in the user space.

According to various embodiments, the virtual interface may be provided in the kernel.

According to various embodiments, information about the software may be communicated using the communication interface.

According to various embodiments, the software may include or may be or may be included in driver (in other words: a device driver), for example for a peripheral device connectable to the computing device, and/or an application.

According to various embodiments, the kernel may be provided in a protected area of the computing device. According to various embodiments, the user space may be provided outside the kernel.

According to various embodiments, a computer-readable medium may be provided. The computer-readable medium may include instructions which, when executed by a computer, make the computer perform a method for controlling a computing device. The method may include: controlling a central processing unit; providing using a kernel an interface between the central processing unit and an application to be executed by the central processing unit; providing a software in a user space; providing a virtual file system in the kernel; and communicating using a communication interface between the software and the virtual file system.

According to various embodiments, the virtual file system may include or may be or may be included in a ProcFS and/or a SysFS.

According to various embodiments, the communication interface may include or may be or may be included in a fuse interface.

According to various embodiments, the fuse interface may be provided in the kernel.

According to various embodiments, the communication interface may include or may be or may be included in a virtual interface.

According to various embodiments, the virtual interface may be provided in the user space.

According to various embodiments, the virtual interface may be provided in the kernel.

According to various embodiments, information about the software may be communicated using the communication interface.

According to various embodiments, the software may include or may be or may be included in a driver for a peripheral device connectable to the computing device and/ or an application.

According to various embodiments, the kernel may be provided in a protected area of the computing device. According to various embodiments, the user space may be provided outside the kernel.

Figure 3B:
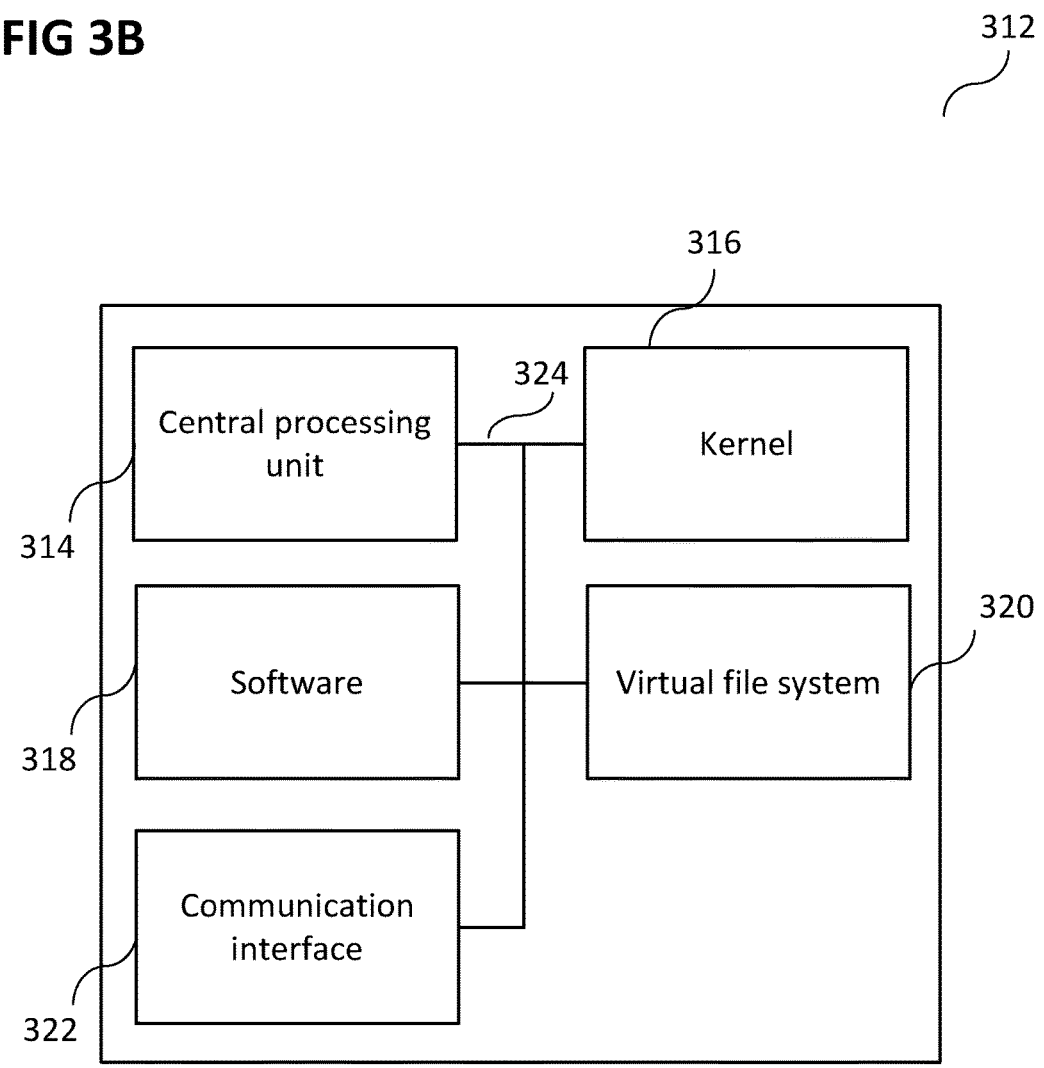
FIG. 3B shows a computing device according to various embodiments.

FIG. 3B shows a computing device 312 (for example a mobile computing device, for example a mobile phone, for example a smart device, for example a smartphone, for example a tablet, for example a desktop computing device, or for example a notebook) according to various embodiments. The computing device 312 may include a central processing unit 314 (CPU). The computing device 312 may further include a kernel 316 configured to provide an interface between the central processing unit 314 and an application to be executed by the central processing unit 314. The computing device 312 may further include a software 318 provided in a user space. The computing device 312 may further include a virtual file system 320 provided in the kernel 316. The computing device 312 may further include a communication interface 322 between the software 318 and the virtual file system 320. The central processing unit 314, the kernel 316, the software 318, the virtual file system 320, and the communication interface 322 may be coupled with each other, like indicated by lines 324, for example electrically coupled, for example using a line or a cable, and/or mechanically coupled.

According to various embodiments, the virtual file system 320 may include or may be or may be included in a ProcFS and/or a SysFS.

According to various embodiments, the communication interface 322 may include or may be or may be included in a fuse interface.

According to various embodiments, the fuse interface may be provided in the kernel 316.

According to various embodiments, the communication interface 322 may include or may be or may be included in a virtual interface.

According to various embodiments, the virtual interface may be provided in the user space.

According to various embodiments, the virtual interface may be provided in the kernel 316.

According to various embodiments, the communication interface 322 may be configured to communicate information about the software.

According to various embodiments, the software 318 may include or may be or may be included in a driver for a peripheral device connectable to the computing device and/ or an application.

According to various embodiments, the kernel 316 may be provided in a protected area of the computing device 312. The user space may be provided outside the kernel 316 (for example in the computing device 312 or for example external to the computing device 312).

According to various embodiments, a device driver may make use of fuse.

Figure 4:
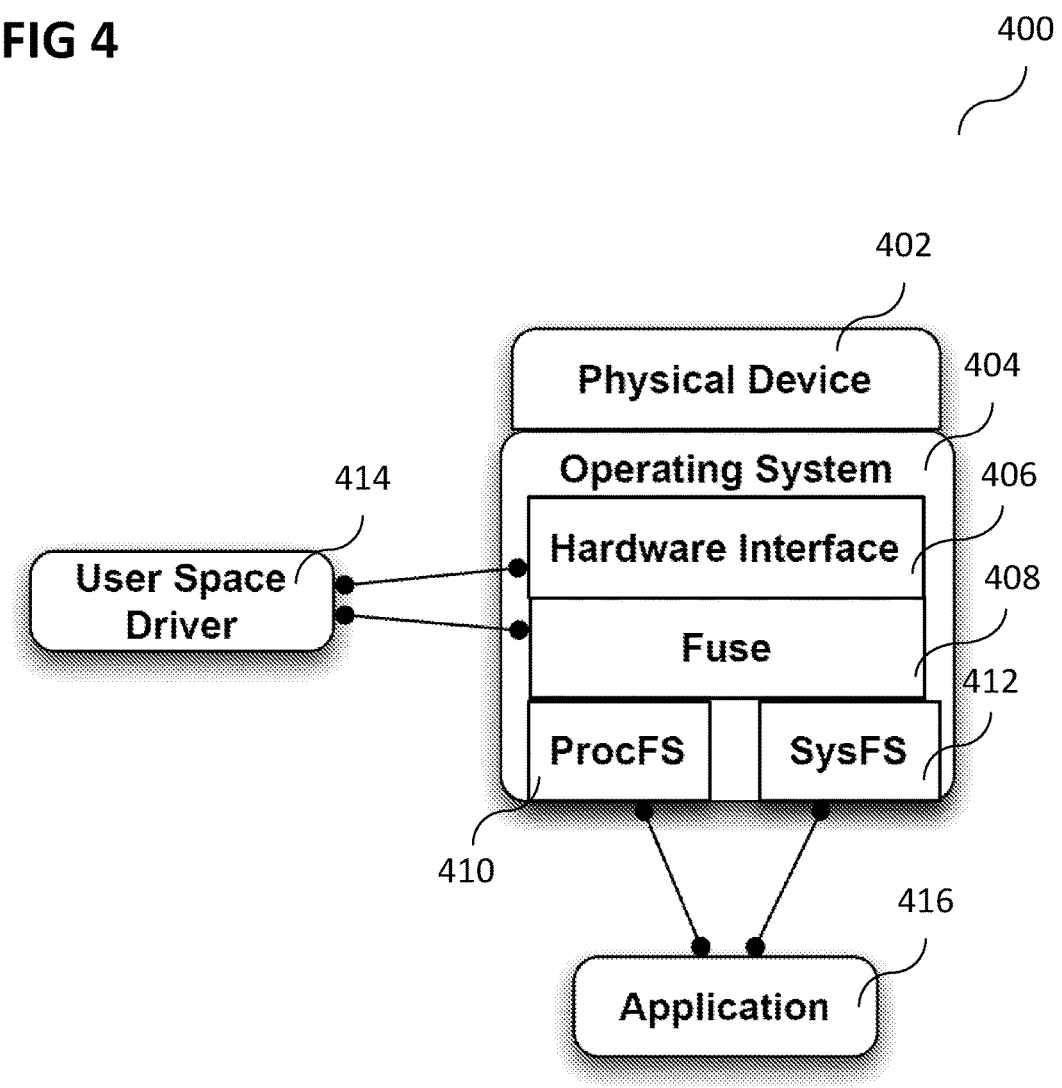
FIG. 4 shows an illustration of a device driver using fuse directly for control/information interface according to various embodiments.

FIG. 4 shows an illustration 400 of a device driver using fuse directly for control/information interface according to various embodiments. A physical device 402 may include an operating system 404. A hardware interface 406 and a fuse interface 408 may be used for communication with a user space (device) driver 414 (in other words: with a hardware driver in user space). The user space device driver 414 may create a virtual file system for setup and informational purposes by making use of the fuse interface 408. An application 416 may read or write into the virtual file space to gather information or setup the device driver (for example via a ProcFS 410 and/or a SysFS 412).

According to various embodiments, a virtual device driver may be provided (or created) which provides an interface for device drivers to export data.

Figure 5:
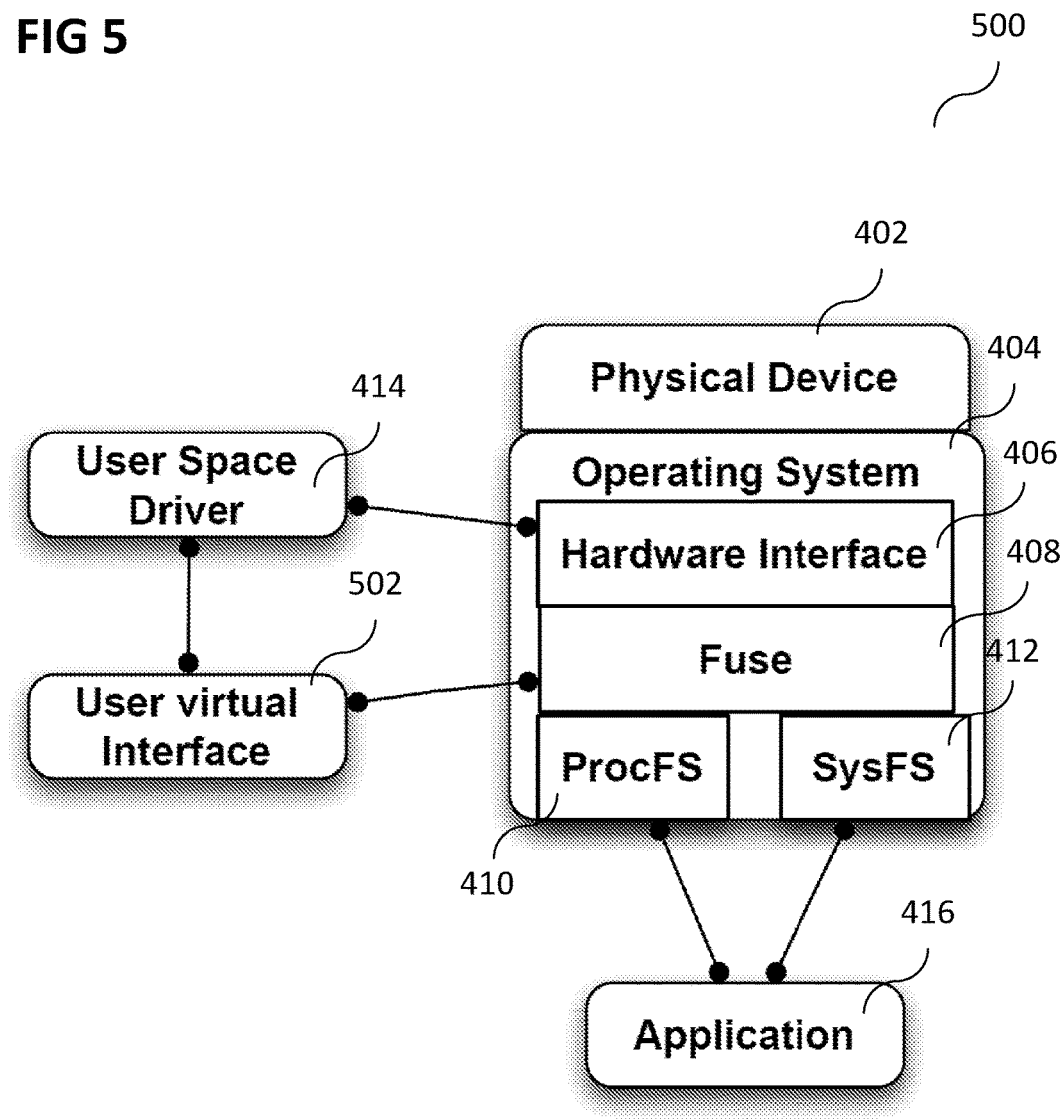
FIG. 5 shows an illustration of using a fuse driver to create a proc or sys interface according to various embodiments.

FIG. 5 shows an illustration 500 of using a fuse driver to create a proc or sys interface according to various embodiments. Various portions of the illustration 500 may be identical or similar to portions of the illustration 400 of FIG. 4, so that the same reference signs may be used and duplicate description may be omitted.

As the fuse driver may be very complex, according to various embodiments a library (in other words: user virtual interface 502) may be provided that allows any device driver to interface another user space driver that creates a virtual file system using fuse. According to various embodiments, a method of an application to make use of the virtual file system, to provide a list of its own options that could be changed, or its configuration may be provided. This may allow bash scripts, or other applications to configure an application making use of this, by simple reading/writing value to a file. This may enhance application to configuration files, and may allow values to be changed at runtime. The various signals used to modify the values may be done with open/write/close functions in the fuse system.

The user virtual interface 502 may be a library that creates a shared memory interface, sockets or IPC (inter-process communication) messages to another user space driver 414 that stores the information into a database and creates a virtual file system for application to use to find a device status.

According to various embodiments, fuse may be ignored, and a virtual kernel driver for user space drivers may be provided.

Figure 6:
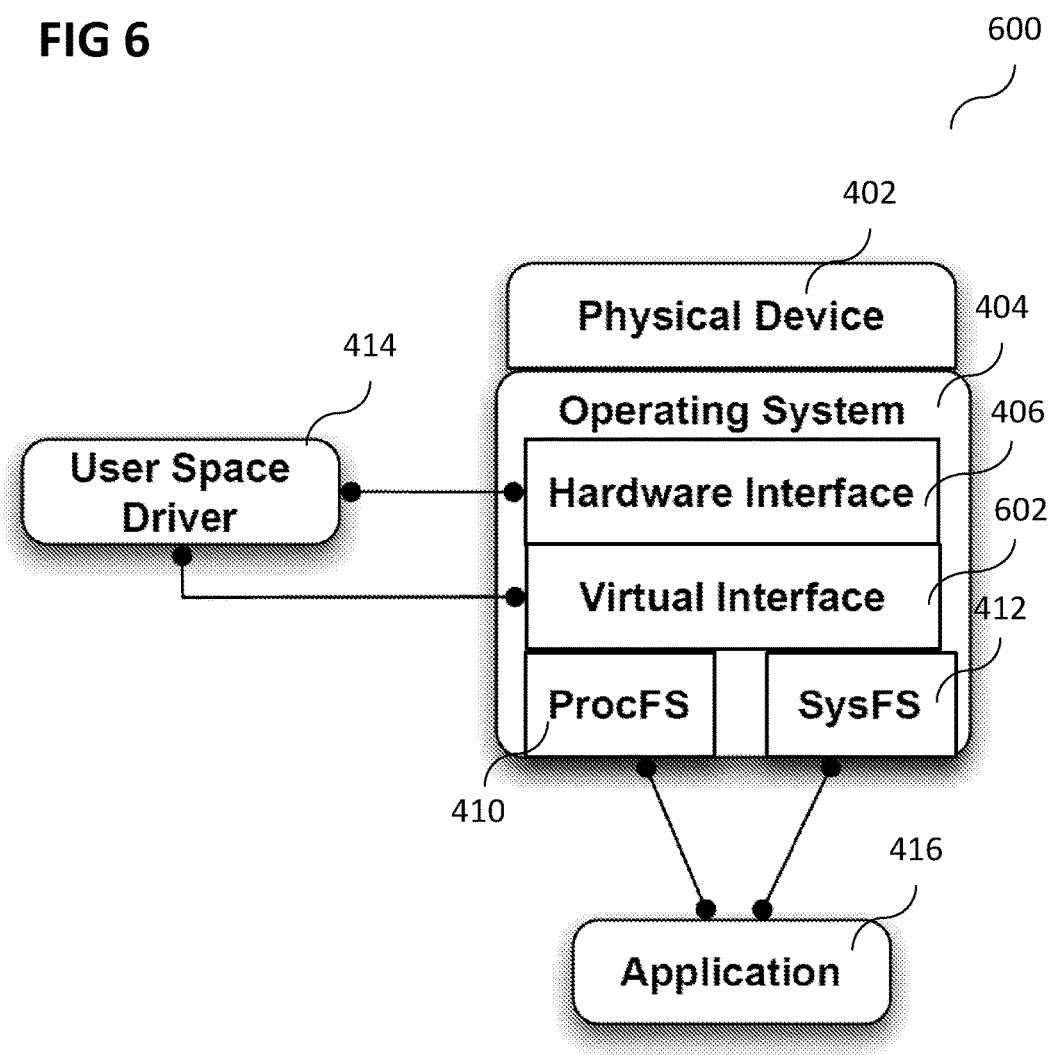
FIG. 6 shows an illustration of a virtual interface for Proc and Sys which user space drivers can use according to various embodiments.

FIG. 6 shows an illustration 600 of a virtual interface 602 for Proc (in other words: ProcFS) and Sys (in other words: SysFS) which user space drivers can use according to various embodiments. Various portions of the illustration 600 may be identical or similar to portions of the illustration 400 of FIG. 4, so that the same reference signs may be used and duplicate description may be omitted.

Since the fuse interface is very complex, according to various embodiments, another kernel (for example Linux/Android/Unix kernel) may be provided to control the proc/Sys interface. The virtual interface 602 may allow any user driver to access it, and may describe the virtual files that need to be available to user applications.

The devices and methods according to various embodiments may allow an application to write information into the virtual file system, and change configuration parameters of the user space driver.

According to various embodiments, a device status may be communicated using a virtual file system. Using a user space proc system according to various embodiments may allow any application to remain unchanged, while various subsystems are moved from the kernel to user space.

According to various embodiments, Bluetooth, Wifi and NFC (near field communication) may be moved from the Linux kernel into user space. This may allow manufactures to update drivers without risking critical sections of the operating system. The movement into user space may also allow for proprietary device driver code to be added into the system.

According to various embodiments, it may be maintained how devices communicate with applications and this may enhance how systems are designed in the future. Less code may be needed to track driver options, since previously existing systems may be maintained.

In android, effort is made to create intents, and JNI (Java Native Interface) interfaces for applications to control the lower layer of the device. Using the devices and methods according to various embodiments may aid in debugging, and may not require creating intents or JNI layers. Applications may modify a virtual file, as they currently do now.

If specific hardware is added to a system, using the method according to various embodiments may allow to add drivers to devices (for example Android devices), without modifying the code (for example the Android Open Source Project code). This may provide for an easier merging of code, and may require less contamination with GPL or other licenses.

According to various embodiments, devices and methods may control and gather status of virtual machines using a virtual file interface.

It will be understood that although various embodiments are described with respect to a user space device driver, various embodiments may also be applied to an application (for example any user space application, for example a simple application). Various embodiments may be applied to any application that uses a configuration file to switch to a virtual file system may be. This may allow values to be set during runtime of the application, or to obtain status during runtime. For example, for an application (for example a word processor or a database), configurations of the application may be changed on the fly with the virtual file system.

According to various embodiments, although various embodiments are described with respect to user space device drivers, various embodiments may be applied to a media client. For example, passwords or locations may be passed along, using a strip that writes the values to the virtual file system, and the application may then receive the value. Various embodiments may be applied to configuration files, which may allow changing of values during runtime of an application.

Various embodiments may be provided for a user space application configured to display configuration, status, or to have its options changed at run-time. According to various embodiments, a library may be provided to create an interface for that application.

The following examples pertain to further embodiments.

Example 1 is a method for controlling a computing device, the method comprising: controlling a central processing unit; providing using a kernel an interface between the central processing unit and an application to be executed by the central processing unit; providing a software in a user space; providing a virtual file system in the kernel; and communicating using a communication interface between the software and the virtual file system.

In example 2, the subject-matter of example 1 can optionally include that the virtual file system comprises at least one of a ProcFS and a SysFS.

In example 3, the subject-matter of any one of examples 1 to 2 can optionally include that the communication interface comprises a fuse interface.

In example 4, the subject-matter of any one of examples 1 to 3 can optionally include that the fuse interface is provided in the kernel.

In example 5, the subject-matter of any one of examples 1 to 4 can optionally include that the communication interface comprises a virtual interface.

In example 6, the subject-matter of example 5 can optionally include that the virtual interface is provided in the user space.

In example 7, the subject-matter of any one of examples 5 to 6 can optionally include that the virtual interface is provided in the kernel.

In example 8, the subject-matter of any one of examples 1 to 7 can optionally include that information about the software is communicated using the communication interface.

In example 9, the subject-matter of any one of examples 1 to 8 can optionally include that the software comprises at least one of a driver for a peripheral device connectable to the computing device or an application.

In example 10, the subject-matter of any one of examples 1 to 9 can optionally include that the kernel is provided in a protected area of the computing device; wherein the user space is provided outside the kernel.

Example 11 is a computer-readable medium comprising instructions which, when executed by a computer, make the computer perform a method for controlling a computing device, the method comprising: controlling a central processing unit; providing using a kernel an interface between the central processing unit and an application to be executed by the central processing unit; providing a software in a user space; providing a virtual file system in the kernel; and communicating using a communication interface between the software and the virtual file system.

In example 12, the subject-matter of example 11 can optionally include that the virtual file system comprises at least one of a ProcFS and a SysFS.

In example 13, the subject-matter of any one of examples 11 to 12 can optionally include that the communication interface comprises a fuse interface.

In example 14, the subject-matter of any one of examples 11 to 13 can optionally include that the fuse interface is provided in the kernel.

In example 15, the subject-matter of any one of examples 11 to 14 can optionally include that the communication interface comprises a virtual interface.

In example 16, the subject-matter of example 15 can optionally include that the virtual interface is provided in the user space.

In example 17, the subject-matter of any one of examples 15 to 16 can optionally include that the virtual interface is provided in the kernel.

In example 18, the subject-matter of any one of examples 11 to 17 can optionally include that information about the software is communicated using the communication interface.

In example 19, the subject-matter of any one of examples 11 to 18 can optionally include that the software comprises at least one of a driver for a peripheral device connectable to the computing device or an application.

In example 20, the subject-matter of any one of examples 11 to 19 can optionally include that the kernel is provided in a protected area of the computing device; wherein the user space is provided outside the kernel.

Example 21 is a computing device comprising: a central processing unit; a kernel configured to provide an interface between the central processing unit and an application to be executed by the central processing unit; a software provided in a user space; a virtual file system provided in the kernel; and a communication interface between the software and the virtual file system.

In example 22, the subject-matter of example 21 can optionally include that the virtual file system comprises at least one of a ProcFS and a SysFS.

In example 23, the subject-matter of any one of examples 21 to 22 can optionally include that the communication interface comprises a fuse interface.

In example 24, the subject-matter of any one of examples 21 to 23 can optionally include that the fuse interface is provided in the kernel.

In example 25, the subject-matter of any one of examples 21 to 24 can optionally include that the communication interface comprises a virtual interface.

In example 26, the subject-matter of example 25 can optionally include that the virtual interface is provided in the user space.

In example 27, the subject-matter of any one of examples 25 to 26 can optionally include that the virtual interface is provided in the kernel.

In example 28, the subject-matter of any one of examples 21 to 27 can optionally include that the communication interface is configured to communicate information about the software.

In example 29, the subject-matter of any one of examples 21 to 28 can optionally include that the software comprises at least one of a driver for a peripheral device connectable to the computing device or an application.

In example 30, the subject-matter of any one of examples 21 to 29 can optionally include that the kernel is provided in a protected area of the computing device; wherein the user space is provided outside the kernel.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for controlling a computing device, the method comprising:
   controlling a central processing unit;
   providing, using a kernel, an interface between the central processing unit and an application to be executed by the central processing unit;
   providing a device driver in a user space;
   providing a virtual file system in the kernel, the virtual file system being created by the device driver using a Filesystem in Userspace interface; and
   communicating using a communication interface between the device driver and the virtual file system, wherein the application uses the virtual file system to interact with the device driver in the user space.

2. The method of claim 1,
   wherein the communication interface comprises the Filesystem in Userspace interface.

3. The method of claim 1,
   wherein the communication interface comprises a virtual interface.

4. The method of claim 3,
   wherein the virtual interface is provided in the user space.

5. The method of claim 3,
   wherein the virtual interface is provided in the kernel.

6. The method of claim 1,
   wherein information about the device driver is communicated using the communication interface.

7. A computer-readable medium comprising instructions which, when executed by a computer, make the computer perform a method for controlling a computing device, the method comprising:
   controlling a central processing unit;
   providing using a kernel an interface between the central processing unit and an application to be executed by the central processing unit;
   providing a device driver in a user space;
   providing a virtual file system in the kernel, the virtual file system being created by the device driver using a Filesystem in Userspace interface; and
   communicating using a communication interface between the device driver and the virtual file system, wherein the application uses the virtual file system to interact with the device driver in the user space.

8. The computer-readable medium of claim 7, wherein the communication interface comprises a fuse the Filesystem in Userspace interface.

9. The computer-readable medium of claim 7, wherein the communication interface comprises a virtual interface.

10. The computer-readable medium of claim 9, wherein the virtual interface is provided in the user space.

11. The computer-readable medium of claim 9, wherein the virtual interface is provided in the kernel.

12. The computer-readable medium of claim 7, wherein information about the device driver is communicated using the communication interface.

13. The computer-readable medium of claim 7, wherein the kernel is provided in a protected area of the computing device; and
wherein the user space is provided outside the kernel.

14. A computing device comprising:
a central processing unit;
a kernel configured to provide an interface between the central processing unit and an application to be executed by the central processing unit;
a device driver provided in a user space;
a virtual file system provided in the kernel, the virtual file system being created by the device driver using a Filesystem in Userspace interface; and
a communication interface between the device driver and the virtual file system, wherein the application uses the virtual file system to interact with the device driver in the user space.

15. The computing device of claim 14, wherein the communication interface comprises the Filesystem in Userspace interface.

16. The computing device of claim 14, wherein the communication interface comprises a virtual interface.

17. The computing device of claim 16, wherein the virtual interface is provided in the user space.

18. The computing device of claim 16, wherein the virtual interface is provided in the kernel.

19. The computing device of claim 14, wherein the communication interface is configured to communicate information about the device driver.

20. The computing device of claim 14, wherein the kernel is provided in a protected area of the computing device; and
wherein the user space is provided outside the kernel.

* * * * *